Figure 1:
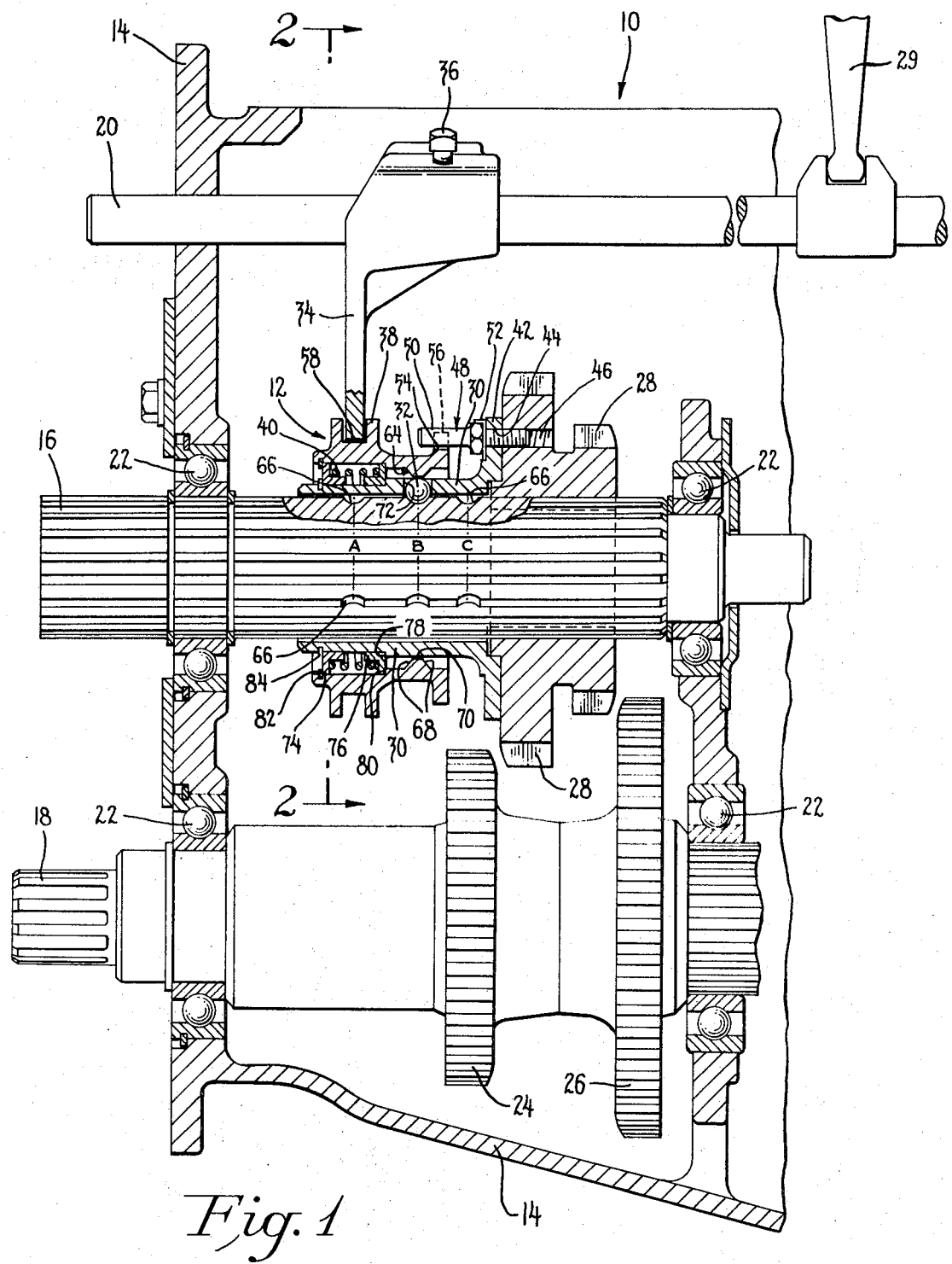

United States Patent [19]
Dornan

[11] 3,800,617
[45] Apr. 2, 1974

[54] SELECTOR LOCK
[75] Inventor: Arthur E. Dornan, Ann Arbor, Mich.
[73] Assignee: Massey-Ferguson Inc., Detroit, Mich.
[22] Filed: July 12, 1972
[21] Appl. No.: 271,095

[52] U.S. Cl................................. 74/475, 74/527
[51] Int. Cl. ..................... G05g 5/06, G05g 9/12
[58] Field of Search ......... 74/475, 527; 287/DIG. 5; 285/316

[56] References Cited
UNITED STATES PATENTS

| | | | |
|---|---|---|---|
| 3,351,363 | 11/1967 | Downey et al.................. | 285/316 X |
| 1,379,891 | 5/1921 | Aichele........................... | 74/475 UX |
| 2,165,872 | 7/1939 | Reggio............................ | 192/53 G |
| 2,521,701 | 9/1950 | Earle et al....................... | 285/316 X |
| 3,177,011 | 4/1965 | Ogne............................... | 285/316 X |
| 3,290,960 | 12/1966 | McCay, Jr. ..................... | 74/527 |
| 3,352,576 | 11/1967 | Thomsen ........................ | 275/316 X |
| 3,606,394 | 9/1971 | Maurer et al..................... | 285/316 |

*Primary Examiner*—Allan D. Herrmann
*Attorney, Agent, or Firm*—Thomas P. Lewandowski

[57] ABSTRACT

A locking device for two slidably connected members one of which is notched, the other of which has an aperture for a detent which is released or retained in the notch by a third member which is normally positioned to retain the detent by biasing means and slidably connected to the member with the aperture therein in either of two axial directions to release the detent. In one embodiment, the notched member is a shaft with a sliding gear on it and a sleeve attached to the gear having an aperture therein. Another sleeve or ring is axially slidably attached to the above sleeve to retain a ball within the aperture in a notch on the shaft.

4 Claims, 2 Drawing Figures

SELECTOR LOCK

Slidable members, having devices for positioning the members axially of another member upon which the members slide, are known and used extensively in vehicle transmissions to position both gears on their shafts and selector forks on their selector rails. The devices used include radially spring loaded balls bearing against either the slidable gear or selector fork giving rise to a frictional force to resist free axial movement of the gear. Often, the selector rails are notched to allow the ball to engage the notch to further retard axial movement of the selector fork. However, the notches are designed to release the ball against the radial force of the spring under a predetermined axial force to permit shifting by movement in the axial direction. Use of springs exerting axial force to position selector forks and the gears attached thereto in positions in which the notch in the selector rail would be retained by a spring loaded ball are also known.

All of the above devices are subject to axial movement upon sufficient axial force being applied from the meshing gears as well as from the mechanism for shifting the gears.

It is also known to use a ball lock to axially position a shaft within the housing of a coupling by providing an axially biasing spring on a ball retaining member to retain the ball in engagement with notches within the coupling housing. The ball is releasable by applying an axial force on the retaining member sufficient to overcome the spring bias, but since the ball is not radially biased no other axial forces on the coupling can release the coupling.

The above coupling ball lock is not useful for sliding members within a transmission because it can only be released by movement in one axial direction, and would add substantial bulk to the transmission and the resultant added space requirements often are not available.

The present locking device is particularly suitable for a transmission receiving heavy use in that it overcomes the above problems of the transmission positioning devices which are subject to axial forces on gears applied by the gear train, and does not require a bulky coupling housing thereby simplifying the design. Further, the present locking device is operable in either of the two axial directions to release the gear thereby permitting the locking device to be incorporated on gears which must be shifted back and forth by a selector fork.

The present invention relates to a locking device for slidably connected members and more particularly to a locking device for positively fixedly positioning a gear relative to a shaft. Generally, the locking device prevents axial movement between a first member having a notch and a second member slidably attached to the first member and having an aperture in it. A detent within the aperture in the second member engages the notch in the first member and a third member slidably attached to the second member has a protrusion on it for selectively engaging and releasing the detent from its engagement within the notch. Means normally biasing the third member to position the protrusion over the aperture gives the third member the capability of releasing the detent in either of two axial directions.

In one embodiment, the first member is a shaft and the second member is a gear including a first element attached to the gear with an aperture in it. The third member is a second element slidably attached to the first element. An example of the elements would be a pair of concentric sleeves or rings. A detent within the aperture in the inner sleeve or ring engages the notch on the shaft on which it is slidably mounted. Means for biasing the outer sleeve or ring, for example with a spring, are provided to engage the detent and retain it in engagement with the notch on the shaft absent an axial force sufficient to overcome the spring.

Figure 2:
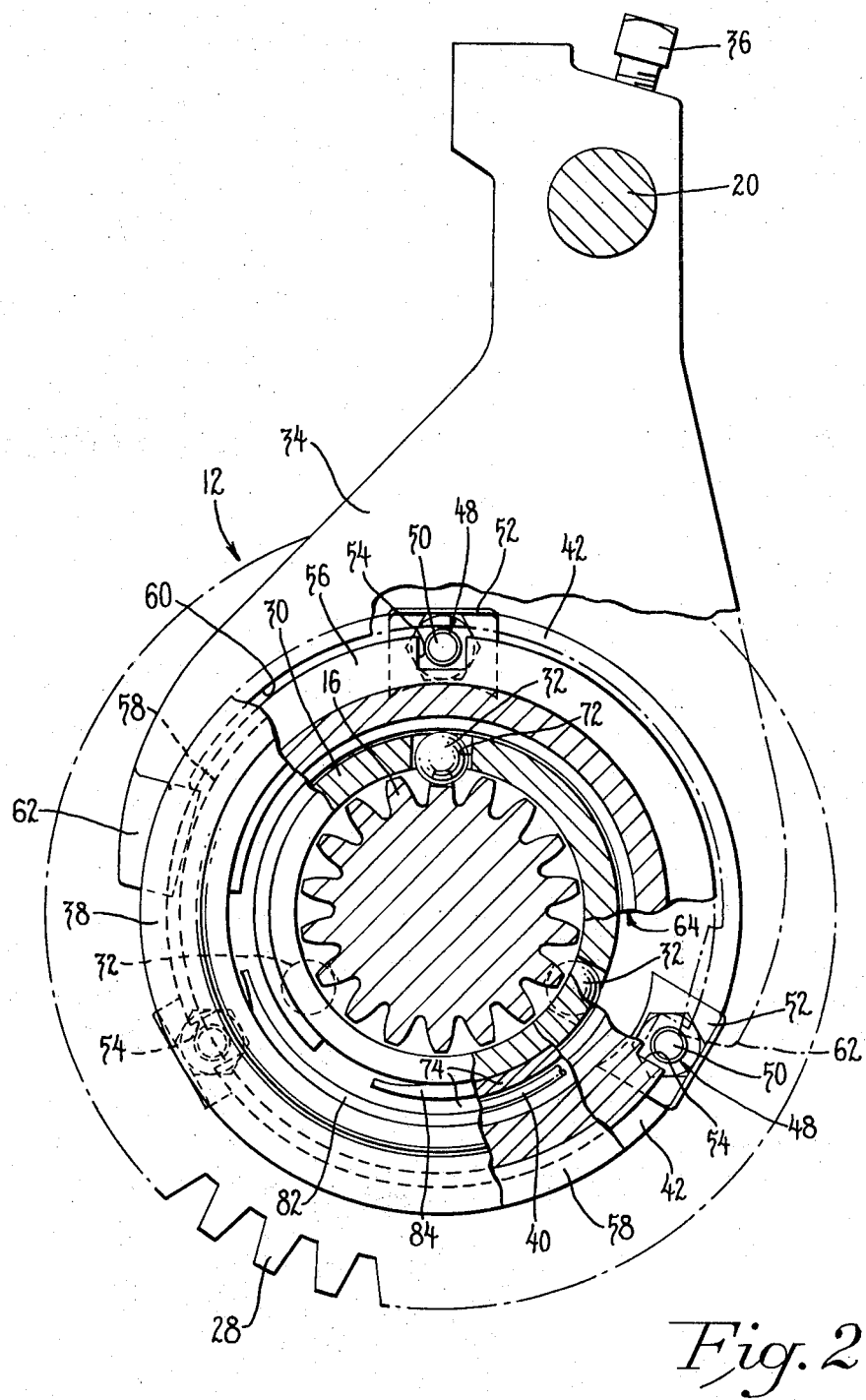

FIG. 1 is a fragmentary cross-sectional view of a transmission incorporating a locking device in accordance with the present invention with parts broken away to reveal further detail; and FIG. 2 is a partial cross-sectional view of the transmission further illustrating the locking device, with parts broken away to reveal further detail, taken along line 2—2 of FIG. 1.

In FIG. 1 a transmission, designated generally by the numeral 10, is presented as one form for the use of the present locking device, designated generally by the numeral 12. The transmission 10 is typical and generally known in the art having a casing 14 which houses a main shaft 16, countershaft 18 and selector rail 20. The shafts 16 and 18 are mounted in bearings 22 to permit them to rotate upon their longitudinal axes while the selector rail 20 is slidably mounted with respect to the casing 14 within suitable openings therein. Change speed gears 24 and 26 are affixed and positioned in the axial direction on the countershaft 18 and splined thereto to receive rotational motion imparted to the countershaft 18. The gear cluster 28 is slidable on the main shaft 16 and also splined thereto to impart rotational motion to the main shaft 16.

It is to be understood that the locking device is not limited to the gear cluster 28 illustrated and that the locking device could be used with a single gear, more than just the two gears illustrated, or with members other than gears and shafts, for example, a slide retained within a groove on a bar. Further, where the slidable member is other than a gear, the need for developing the member using an additional element such as the locking sleeve 30 may not be required if the member is adaptable to a detent such as the ball 32.

The slidable gear cluster 28 must be capable of fore and aft axial movement to engage the low and high gears 24 and 26, respectively, from the neutral position illustrated. To move the gear cluster 28, a selector fork 34 is mounted on the slidable selector rail and affixed thereto by means of the locking screw 36 (best illustrated in FIG. 2). The selector fork 34 engages the locking device 12 attached to the gear cluster 28 to enable motion of the control lever 29 engaging the selector rail to be transmitted through the selector fork 34 to move the gear cluster 28. Means other than a selector fork 34 could be used for transmitting motion to the gear cluster 28 and actuating the locking device 12. For example, a power operator such as a fluid cylinder could be used to actuate the locking device 12 and move the gear cluster 28.

The locking device 12, in addition to the element of the locking sleeve 30, includes a third member, or second element, such as a selector ring 38 and means, such as a spring 40, normally biasing the third member to position the third member relative to the sleeve 30.

In the embodiment illustrated in FIGS. 1 and 2, the locking sleeve 30 has a flange 42 with a plurality of circumferentially spaced holes 44 therein having spacing corresponding to that of threaded holes 46 in the gear cluster 28. Screws 48 pass through the holes 44 and engage the threads of holes 46 to fixedly attach the locking sleeve 30 to the gear cluster 28. The screws 48 have special heads with shanks 50 extending axially from the tops thereof. A locking clasp 52 engages the head of the screws 48 to prevent them from loosening.

The shanks 50 of the screws 48 pass through slots 54 in a flange 56 on the selector ring 38. Sizing the slots 54 to permit axial movement between the selector ring 38 and the shanks 50 allows the shanks to impart the rotational motion of the gear cluster 28 to the selector ring 38 while providing for axial movement of the selector ring 38. In the above manner, the rotation of the selector ring 38 is synchronized with that of the locking sleeve 30.

Since the selector ring 38 rotates but the selector fork 34 does not, the selector ring 38 is provided with a raised circumferential groove 58 for rotatably engaging the yoke 60 and fingers 62 of the selector fork 34. The groove 58 permits the selector fork 34 to transmit axial motion to the selector ring 38. The selector ring 38 is also provided with a protrusion, such as an inner ring 64, for engaging the ball 32. The protrusion need not be a ring but could be any number of shapes, for example, a knob or like projection or attachment.

It will be noted that where a plurality of balls 32 are spaced over the periphery of the locking sleeve 30, as illustrated in FIG. 2, a corresponding number of knobs or projections would be required whereas only one inner ring 64 would be required. Further, detents other than balls 32 could be used, for example, rollers.

The annular clearance between the inside diameter of the selector ring 38 and the outside diameter of the locking ring 30 must be such as to at least equal the clearance required to permit the ball 32 to move outwardly from and clear a notch in the main shaft 16. The notch may be any of a number of shapes, for example a 'V', but preferably conforms to the shape of the detent as the spherical recess 66 conforms to that of the ball 32 in the embodiment illustrated. Further, the notches in a given plane normal to the main shaft 16 axis could be joined into a single circumferential groove. The purpose of the inner ring 64 is to eliminate the above clearance between the selector ring 38 and the locking sleeve 30 to prevent the ball 32 from disengaging the spherical recess 66. Inclined or beveled sides 68 are provided on the inner ring 64 on either side of a generally flat top surface 70 for initially engaging and subsequently retaining the ball 32, respectively. The beveled sides 68 aid outward and inward movement of the ball 32 upon its release and retention, respectively.

Movement of the ball 32 in the axial direction relative to the locking sleeve 30 is restricted by an aperture, such as the circular hole 72 illustrated, in the locking sleeve 30. The inward and outward movement of the ball 32 is restricted to the confines of the hole 72 by clearances between the selector ring 38 and the locking sleeve 30.

The number of spherical recesses 66 spaced circumferentially over the main shaft 16 corresponds to the number and spacing of the balls 32, and the spacing and number of spherical recesses 66 in the axial direction corresponds to the number of control positions of the gears and the distance to be traveled between positions. In FIG. 1, the main shaft 16 has three axially spaced spherical recess 66 positions designated A, B and C corresponding to the low, neutral and high speed gear positions, respectively.

Included in the biasing means of the embodiment illustrated in addition to the spring 40 are a pair of flanged rings 74 and 76 one of which seats against the shoulders 78 and 80 on the selector ring 38 and locking sleeve 30, respectively. The other flanged ring 74 seats against the snap rings 82 and 84 which engage the selector ring 38 and locking sleeve 30, respectively, to provide a positive stop for the flange ring 74. Both flange rings are slidable with respect to the selector ring 38 and locking ring 30, and are normally maintained separately from each other against their seats by the spring 40 which extends between them and exerts a parting force on them.

In the extended position illustrated in FIG. 1, the spring positions the selector ring 38 relative to the locking sleeve 30 to place the inner ring 64 directly over the hole 72 in the locking sleeve 30. The amount of separation between the flange rings 82 and 84 is sufficient to permit the selector ring 38 to be displaced axially to a position where the inner ring 64 is offset to either side of the hole 72 whereby the ball 32 can move outwardly to clear the spherical recess 66. Other biasing means could be employed other than springs and designs could be developed which would not require the use of the flange rings 82 and 84, but would simply interconnect the biasing means between the selector ring 38 and the locking sleeve 30.

In operation, the locking device 12 positively locks the gear cluster 28 to prevent axial movement between the gear cluster 28 and the main shaft 16 when the gear cluster 28 has been positioned in low, neutral or high control positions. In the above positions, the ball 32 is retained in the spherical recess 66 of the main shaft 16 in positions A, B or C, corresponding to low, neutral or high control positions, by the inner ring 64 on the selector ring 38. There is no way in which the locking sleeve 30 attached to the gear cluster 28 can move the ball 32 within the hole 72 in the locking sleeve 30 as long as the inner ring 64 engages the ball 32 as illustrated in FIG. 1.

When it is necessary to shift the gear cluster 28 from the neutral position B illustrated to engage either low or high gear, the selector fork 34 moves the selector ring 38 axially to the right or left, respectively, causing convergence of either the flange ring 74 toward flange ring 76 or vice versa, respectively. The selector fork 34 exerts only sufficient axial force to overcome the spring 40 and compress it between the flange rings 74 and 76. Compression of the spring 40 occurs because initially the locking sleeve 30 cannot move in the axial direction causing relative movement between the selector ring 38 and the locking sleeve 30. Preferably, the spring force is sufficient to return the selector ring 38 to position the inner ring 64 over the hole 72 in the locking sleeve 30 upon release of the locking sleeve 30 in the axial direction, but not so large as to inhibit the operation and/or sensitivity of the control lever 29.

Upon sufficient relative axial movement between the selector ring 38 and the locking sleeve 30, the inner ring 64 is displaced from its position over the ball 32 allowing the ball 32 to move outwardly from the main shaft 16 and disengage the spherical recess 66. Release of the ball 32 allows axial movement of the locking sleeve 30 in unison with the selector ring 38 to enable the selector fork 34 to move the gear cluster 28 axially to the desired control position. When the desired position is reached, the ball 32 again engages the corresponding spherical recess 66 allowing the spring 40 to expand and again position the inner ring 64 in its locking position directly over the hole 72 in the locking sleeve 30 to engage the ball 32 and retain it within the spherical recess 66.

It should be noted that the axial forces transmitted to the gear cluster 28 by the gear train of the transmission 10 cannot be transmitted to the selector ring 38. Since only an axial force on the selector ring 38 can release the ball 32, there is no way that axial forces on the gear cluster 28, exclusive of the locking device 12, can cause disengagement of the gear cluster 28. The locking device 12 is particularly advantageous for applications where heavy loading occurs periodically on a transmission in the form of loads similar to impact loading as, for example, when a vehicle is raised off its front wheels by an excessive drag load and subsequent slippage permits the vehicle to suddenly fall stopping short of the ground. The momentum of the vehicle is applied to the transmission suddenly at the bottom of its travel tending to cause disengagement of meshed gears. With the use of the present locking device such disengagement is not possible.

In accordance with the provisions of the patent statutes, the principle and mode of operation of the locking device have been explained and what is considered to represent its best embodiment has been illustrated and described. It should, however, be understood that the invention may be practiced otherwise than as specifically illustrated and described without departing from its spirit or scope.

I claim:

1. In a power transmitting drive train having engageable members, one of the members being a transmission force transmitting member, slidable on a notched shaft, a locking device for positively fixedly positioning at least one member relative to the shaft comprising; a first element having an aperture therein and fixed to the transmission force transmitting member to be positioned, a second element slidably and non-rotatably attached to said first element, a detent within the aperture in said first element for engaging the notch in the shaft, and means for biasing said second element to engage said detent to retain said detent in engagement with the notch of the shaft, a protrusion on said second element intermediate said first and second elements for selectively retaining said detent whenever said second element is free of axial force sufficient to overcome said biasing means.

2. The apparatus defined in claim 1 wherein said first and second elements comprise concentric first and second sleeves.

3. The apparatus defined in claim 2 wherein said biasing means includes a helical spring intermediate said first and second sleeves and means connecting said spring to said first and second sleeves, said connecting means slidable with respect to said sleeves.

4. The apparatus defined in claim 3 wherein said sleeves have circular cross sections normal to the axis of the shaft and said protrusion is a ring on the inside of said second sleeve, a plurality of detents in a plurality of apertures spaced over the circumference of said second sleeve, and said connecting means includes a pair of flanged rings in the annulus between said sleeves normally biased one away from the other by said spring extending between said flanged rings to support said second sleeve on said first sleeve and position said ring over said plurality of apertures to engage said plurality of detents.

* * * * *